US010362273B2

(12) United States Patent
Worrill

(10) Patent No.: US 10,362,273 B2
(45) Date of Patent: Jul. 23, 2019

(54) SYSTEMS AND METHODS FOR MANAGING VIDEO DATA

(75) Inventor: Joshua Worrill, Newton (AU)

(73) Assignee: Honeywell International Inc., Morris Plains, NJ (US)

( * ) Notice: Subject to any disclaimer, the term of this patent is extended or adjusted under 35 U.S.C. 154(b) by 963 days.

(21) Appl. No.: 13/566,777

(22) Filed: Aug. 3, 2012

(65) Prior Publication Data
US 2013/0194430 A1    Aug. 1, 2013

(51) Int. Cl.
     *H04N 7/18*      (2006.01)
     *H04N 5/232*      (2006.01)

(52) U.S. Cl.
     CPC .............. *H04N 7/181* (2013.01); *H04N 5/232* (2013.01); *H04N 7/18* (2013.01)

(58) Field of Classification Search
     CPC .......... H04N 7/181; H04N 7/18; H04N 11/22; H04N 9/74; H04N 5/232
     USPC ....................... 348/143, 159, 211.3, 455, 588
     See application file for complete search history.

(56) References Cited

U.S. PATENT DOCUMENTS

| 3,753,232 A | 8/1973 | Sporer |
| 3,806,911 A | 4/1974 | Pripusich |
| 3,857,018 A | 12/1974 | Stark et al. |
| 3,860,911 A | 1/1975 | Hinman et al. |
| 3,866,173 A | 2/1975 | Moorman et al. |
| 3,906,447 A | 9/1975 | Crafton |
| 4,095,739 A | 6/1978 | Fox et al. |
| 4,146,085 A | 3/1979 | Wills |
| 4,148,012 A | 4/1979 | Baump et al. |
| 4,161,778 A | 7/1979 | Getson, Jr. et al. |
| 4,213,118 A | 7/1980 | Genest et al. |
| 4,283,710 A | 8/1981 | Genest et al. |
| 4,298,946 A | 11/1981 | Hartsell et al. |
| 4,332,852 A | 6/1982 | Korklan et al. |
| 4,336,902 A | 6/1982 | Neal |

(Continued)

FOREIGN PATENT DOCUMENTS

| CA | 2240881 | 12/1999 |
| CN | 1265762 | 9/2000 |

(Continued)

OTHER PUBLICATIONS

U.S. Appl. No. 14/129,086, filed Dec. 23, 2013.

(Continued)

*Primary Examiner* — Trang U Tran
(74) *Attorney, Agent, or Firm* — Seager, Tufte & Wickhem LLP

(57) ABSTRACT

Described herein are systems and methods for managing video data. Embodiments are described by reference to a Digital Video Management (DVM) system, for example methods for providing a user with access to view live feed from cameras in a DVM system. In overview, a DVM system is configured to provide a user interface for allowing an operator to view a plurality of video display objects, wherein each display object is configured to display live video data captured at a camera of the DVM system. The user interface is further configured to provide access to one or more camera groups, wherein the one or more camera groups are respectively defined by dynamic parameters. The DVM system executes a process for updating the constituent cameras of each camera group responsive to changes in the dynamic parameters.

20 Claims, 5 Drawing Sheets

(56) References Cited

U.S. PATENT DOCUMENTS

| | | |
|---|---|---|
| 4,337,893 A | 7/1982 | Flanders et al. |
| 4,353,064 A | 10/1982 | Stamm |
| 4,373,664 A | 2/1983 | Barker et al. |
| 4,379,483 A | 4/1983 | Farley |
| 4,462,028 A | 7/1984 | Ryan et al. |
| 4,525,777 A | 6/1985 | Webster et al. |
| 4,538,056 A | 8/1985 | Young et al. |
| 4,556,169 A | 12/1985 | Zervos |
| 4,628,201 A | 12/1986 | Schmitt |
| 4,646,964 A | 3/1987 | Parker et al. |
| 4,685,615 A | 8/1987 | Hart |
| 4,821,177 A | 4/1989 | Koegel et al. |
| 4,847,839 A | 7/1989 | Hudson, Jr. et al. |
| 5,070,468 A | 12/1991 | Niinomi et al. |
| 5,071,065 A | 12/1991 | Aalto et al. |
| 5,099,420 A | 3/1992 | Barlow et al. |
| 5,172,565 A | 12/1992 | Wruck et al. |
| 5,204,663 A | 4/1993 | Lee |
| 5,227,122 A | 7/1993 | Scarola et al. |
| 5,259,553 A | 11/1993 | Shyu |
| 5,271,453 A | 12/1993 | Yoshida et al. |
| 5,361,982 A | 11/1994 | Liebl et al. |
| 5,404,934 A | 4/1995 | Carlson et al. |
| 5,420,927 A | 5/1995 | Micali |
| 5,449,112 A | 9/1995 | Heitman et al. |
| 5,465,082 A | 11/1995 | Chaco |
| 5,479,154 A | 12/1995 | Wolfram |
| 5,481,481 A | 1/1996 | Frey et al. |
| 5,526,871 A | 6/1996 | Musser et al. |
| 5,541,585 A | 7/1996 | Duhame et al. |
| 5,591,950 A | 1/1997 | Imedio-Ocana |
| 5,594,429 A | 1/1997 | Nakahara |
| 5,604,804 A | 2/1997 | Micali |
| 5,610,982 A | 3/1997 | Micali |
| 5,631,825 A | 5/1997 | van Weele et al. |
| 5,640,151 A | 6/1997 | Reis et al. |
| 5,644,302 A | 7/1997 | Hana et al. |
| 5,663,957 A | 9/1997 | Dent |
| 5,666,416 A | 9/1997 | Micali |
| 5,717,757 A | 2/1998 | Micali |
| 5,717,758 A | 2/1998 | Micali |
| 5,717,759 A | 2/1998 | Micali |
| 5,732,691 A | 3/1998 | Maiello et al. |
| 5,774,058 A | 6/1998 | Henry et al. |
| 5,778,256 A | 7/1998 | Darbee |
| 5,793,868 A | 8/1998 | Micali |
| 5,914,875 A | 6/1999 | Monta et al. |
| 5,915,473 A | 6/1999 | Ganesh et al. |
| 5,923,328 A | 7/1999 | Griesmer |
| 5,923,817 A | 7/1999 | Nakamura |
| 5,927,398 A | 7/1999 | Maciulewicz |
| 5,930,773 A | 7/1999 | Crooks et al. |
| 5,960,083 A | 9/1999 | Micali |
| 5,973,613 A | 10/1999 | Reis et al. |
| 5,992,194 A | 11/1999 | Baukholt et al. |
| 6,072,402 A | 6/2000 | Kniffin et al. |
| 6,097,811 A | 8/2000 | Micali |
| 6,104,963 A | 8/2000 | Cebasek et al. |
| 6,119,125 A | 9/2000 | Gloudeman et al. |
| 6,141,595 A | 10/2000 | Gloudeman et al. |
| 6,149,065 A | 11/2000 | White et al. |
| 6,154,681 A | 11/2000 | Drees et al. |
| 6,167,316 A | 12/2000 | Gloudeman et al. |
| 6,233,954 B1 | 5/2001 | Mehaffey et al. |
| 6,241,156 B1 | 6/2001 | Kline et al. |
| 6,249,755 B1 | 6/2001 | Yemini et al. |
| 6,260,765 B1 | 7/2001 | Natale et al. |
| 6,268,797 B1 | 7/2001 | Berube et al. |
| 6,292,893 B1 | 9/2001 | Micali |
| 6,301,659 B1 | 10/2001 | Micali |
| 6,318,137 B1 | 11/2001 | Chaum |
| 6,324,854 B1 | 12/2001 | Jayanth |
| 6,334,121 B1 | 12/2001 | Primeaux et al. |
| 6,347,374 B1 | 2/2002 | Drake et al. |
| 6,366,558 B1 | 4/2002 | Howes et al. |
| 6,369,719 B1 | 4/2002 | Tracy et al. |
| 6,374,356 B1 | 4/2002 | Daigneault et al. |
| 6,393,848 B2 | 5/2002 | Roh et al. |
| 6,394,359 B1 | 5/2002 | Morgan |
| 6,424,068 B2 | 7/2002 | Nakagashi |
| 6,453,426 B1 | 9/2002 | Gamache et al. |
| 6,453,687 B2 | 9/2002 | Sharood et al. |
| 6,483,697 B1 | 11/2002 | Jenks et al. |
| 6,487,658 B1 | 11/2002 | Micali |
| 6,490,610 B1 | 12/2002 | Rizvi et al. |
| 6,496,575 B1 | 12/2002 | Vasell et al. |
| 6,516,357 B1 | 2/2003 | Hamann et al. |
| 6,518,953 B1 | 2/2003 | Armstrong |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,583,712 B1 | 6/2003 | Reed et al. |
| 6,604,023 B1 | 8/2003 | Brown et al. |
| 6,615,594 B2 | 9/2003 | Jayanth et al. |
| 6,628,997 B1 | 9/2003 | Fox et al. |
| 6,647,317 B2 | 11/2003 | Takai et al. |
| 6,647,400 B1 | 11/2003 | Moran |
| 6,658,373 B2 | 12/2003 | Rossi et al. |
| 6,663,010 B2 | 12/2003 | Chene et al. |
| 6,665,669 B2 | 12/2003 | Han et al. |
| 6,667,690 B2 | 12/2003 | Durej et al. |
| 6,741,915 B2 | 5/2004 | Poth |
| 6,758,051 B2 | 7/2004 | Jayanth et al. |
| 6,766,450 B2 | 7/2004 | Micali |
| 6,789,739 B2 | 9/2004 | Rosen |
| 6,796,494 B1 | 9/2004 | Gonzalo |
| 6,801,849 B2 | 10/2004 | Szukala et al. |
| 6,801,907 B1 | 10/2004 | Zagami |
| 6,826,454 B2 | 11/2004 | Sulfstede |
| 6,829,332 B2 | 12/2004 | Farris et al. |
| 6,851,621 B1 | 2/2005 | Wacker et al. |
| 6,871,193 B1 | 3/2005 | Campbell et al. |
| 6,886,742 B2 | 5/2005 | Stoutenburg et al. |
| 6,895,215 B2 | 5/2005 | Uhlmann |
| 6,910,135 B1 | 6/2005 | Grainger |
| 6,967,612 B1 | 11/2005 | Gorman et al. |
| 6,969,542 B2 | 11/2005 | Klasen-Memmer et al. |
| 6,970,070 B2 | 11/2005 | Juels et al. |
| 6,973,410 B2 | 12/2005 | Seigel |
| 6,983,889 B2 | 1/2006 | Alles |
| 6,989,742 B2 | 1/2006 | Ueno et al. |
| 7,004,401 B2 | 2/2006 | Kallestad |
| 7,019,614 B2 | 3/2006 | Lavelle et al. |
| 7,032,114 B1 | 4/2006 | Moran |
| 7,055,759 B2 | 6/2006 | Wacker et al. |
| 7,076,083 B2 | 7/2006 | Blazey |
| 7,117,356 B2 | 10/2006 | LaCous |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,283,489 B2 | 10/2007 | Palaez et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,408,925 B1 | 8/2008 | Boyle et al. |

(56) References Cited

U.S. PATENT DOCUMENTS

| | | |
|---|---|---|
| 7,468,662 B2 | 12/2008 | Velipasalar et al. |
| 7,487,538 B2 | 2/2009 | Mok |
| 7,505,914 B2 | 3/2009 | McCall |
| 7,542,867 B2 | 6/2009 | Steger et al. |
| 7,543,327 B1 | 6/2009 | Kaplinsky |
| 7,574,734 B2 | 8/2009 | Fedronic et al. |
| 7,576,770 B2 | 8/2009 | Metzger et al. |
| 7,583,401 B2 | 9/2009 | Lewis |
| 7,586,398 B2 | 9/2009 | Huang et al. |
| 7,600,679 B2 | 10/2009 | Kshirsagar et al. |
| 7,620,644 B2 | 11/2009 | Cote et al. |
| 7,634,662 B2 | 12/2009 | Monroe |
| 7,644,367 B2 | 1/2010 | McKeon et al. |
| 7,661,603 B2 | 2/2010 | Yoon et al. |
| 7,680,814 B2 | 3/2010 | Mercer et al. |
| 7,683,940 B2 | 3/2010 | Fleming |
| 7,735,132 B2 | 6/2010 | Brown et al. |
| 7,735,145 B2 | 6/2010 | Kuehnel et al. |
| 7,794,536 B2 | 9/2010 | Roy et al. |
| 7,801,870 B2 | 9/2010 | Oh et al. |
| 7,818,026 B2 | 10/2010 | Hartikainen et al. |
| 7,839,926 B1 | 11/2010 | Metzger et al. |
| 7,853,987 B2 | 12/2010 | Balasubramanian et al. |
| 7,861,314 B2 | 12/2010 | Serani et al. |
| 7,873,441 B2 | 1/2011 | Synesiou et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 7,999,847 B2 | 8/2011 | Donovan et al. |
| 8,045,960 B2 | 10/2011 | Orakkan |
| 8,069,144 B2 | 11/2011 | Quinlan et al. |
| 8,089,341 B2 | 1/2012 | Nakagawa et al. |
| 8,095,889 B2 | 1/2012 | DeBlaey et al. |
| 8,102,240 B2 | 1/2012 | Birchbauer et al. |
| 8,108,200 B2 | 1/2012 | Anne et al. |
| 8,166,532 B2 | 4/2012 | Chowdhury et al. |
| 8,174,572 B2 | 5/2012 | Buehler et al. |
| 8,179,227 B2 | 5/2012 | Dziadosz |
| 8,199,196 B2 | 6/2012 | Klein et al. |
| 8,222,990 B2 | 7/2012 | Gerner et al. |
| 8,232,860 B2 | 7/2012 | Goel |
| 8,272,053 B2 | 9/2012 | Markham et al. |
| 8,316,407 B2 | 11/2012 | Lee et al. |
| 8,341,695 B2 | 12/2012 | Thomas et al. |
| 8,350,666 B2 | 1/2013 | Kore |
| 8,351,350 B2 | 1/2013 | Bhandari et al. |
| 8,479,029 B2 | 6/2013 | Adams et al. |
| 8,509,987 B2 | 8/2013 | Resner |
| 8,560,970 B2 | 10/2013 | Liddington |
| 8,605,151 B2 | 12/2013 | Bellamy et al. |
| 8,922,658 B2 | 12/2014 | Galvin |
| 9,036,828 B2 | 5/2015 | Schambeck |
| 2002/0011923 A1 | 1/2002 | Cunningham et al. |
| 2002/0016971 A1 | 2/2002 | Berezowski et al. |
| 2002/0022991 A1 | 2/2002 | Sharood et al. |
| 2002/0046337 A1 | 4/2002 | Micali |
| 2002/0118096 A1 | 8/2002 | Hoyos et al. |
| 2002/0121961 A1 | 9/2002 | Huff |
| 2002/0165824 A1 | 11/2002 | Micali |
| 2002/0170064 A1 | 11/2002 | Monroe et al. |
| 2003/0033230 A1 | 2/2003 | McCall |
| 2003/0071714 A1 | 4/2003 | Bayer et al. |
| 2003/0174049 A1 | 9/2003 | Beigel et al. |
| 2003/0208689 A1 | 11/2003 | Garza |
| 2003/0233432 A1 | 12/2003 | Davis et al. |
| 2004/0061714 A1 | 4/2004 | Sinclair et al. |
| 2004/0062421 A1 | 4/2004 | Jakubowski et al. |
| 2004/0064453 A1 | 4/2004 | Ruiz et al. |
| 2004/0068583 A1 | 4/2004 | Monroe et al. |
| 2004/0087362 A1 | 5/2004 | Beavers |
| 2004/0125124 A1 | 7/2004 | Kim et al. |
| 2004/0205350 A1 | 10/2004 | Waterhouse et al. |
| 2004/0267694 A1 | 12/2004 | Sakai et al. |
| 2005/0138380 A1 | 6/2005 | Fedronic et al. |
| 2005/0200714 A1 | 9/2005 | Marchese |
| 2006/0077262 A1* | 4/2006 | Miyamaki et al. ...... 348/211.99 |
| 2006/0017939 A1 | 6/2006 | Jamieson et al. |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0037432 A1 | 2/2008 | Cohen et al. |
| 2008/0173709 A1 | 7/2008 | Ghosh |
| 2009/0018900 A1 | 1/2009 | Waldron et al. |
| 2009/0063517 A1 | 3/2009 | Wright et al. |
| 2009/0080443 A1 | 3/2009 | Dziadosz |
| 2009/0086692 A1 | 4/2009 | Chen |
| 2009/0097815 A1 | 4/2009 | Lahr et al. |
| 2009/0168695 A1 | 7/2009 | Johar et al. |
| 2009/0258643 A1 | 10/2009 | McGuffin |
| 2009/0266885 A1 | 10/2009 | Marcinowski et al. |
| 2009/0292995 A1 | 11/2009 | Anne et al. |
| 2009/0328203 A1 | 12/2009 | Haas |
| 2010/0026811 A1 | 2/2010 | Palmer |
| 2010/0036511 A1 | 2/2010 | Dongare |
| 2010/0220715 A1 | 9/2010 | Cherchali et al. |
| 2010/0269173 A1 | 10/2010 | Srinvasa et al. |
| 2011/0043631 A1 | 2/2011 | Marman et al. |
| 2011/0071929 A1 | 3/2011 | Morrison |
| 2011/0115602 A1 | 5/2011 | Bhandari et al. |
| 2011/0133884 A1 | 6/2011 | Kumar et al. |
| 2011/0153791 A1 | 6/2011 | Jones et al. |
| 2011/0167488 A1 | 7/2011 | Roy et al. |
| 2011/0181414 A1 | 7/2011 | G. et al. |
| 2012/0096131 A1 | 4/2012 | Bhandari et al. |
| 2012/0106915 A1 | 5/2012 | Palmer |
| 2012/0121229 A1 | 5/2012 | Lee |
| 2012/0133482 A1 | 5/2012 | Bhandari et al. |
| 2012/0326868 A1 | 12/2012 | Goel |
| 2013/0010111 A1 | 1/2013 | Laforte et al. |
| 2013/0036356 A1 | 2/2013 | Worrill et al. |
| 2015/0363478 A1 | 12/2015 | Haynes |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |
| WO | WO 02/091311 | 11/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | WO 2006/126974 | 11/2006 |
| WO | WO 2007/043798 | 4/2007 |
| WO | WO 2008/045918 | 4/2008 |
| WO | WO 2008/144803 | 12/2008 |

(56) References Cited

FOREIGN PATENT DOCUMENTS

| WO | WO 2010/039598 | 4/2010 |
|---|---|---|
| WO | WO 2010/106474 | 9/2010 |

OTHER PUBLICATIONS

"Certificate Validation Choices," CoreStreet, Inc., 8 pages, 2002.
"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
"Keyfast Technical Overview", Corestreet Ltd., 21 pages, 2004.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
Smith, "Working with Checkboxes in the WPF TreeView," Code Project, available at http://www.codeproject.com/Articles/28306/Working-with-Checkboxes-in-the-WPF-TreeView?display=print, 8 pages, printed Dec. 29, 2015.

\* cited by examiner

SYSTEMS AND METHODS FOR MANAGING VIDEO DATA

This application claims priority under 35 U.S.C. § 119 to Australian (AU) Patent Application No. 2011903152, filed on Aug. 5, 2011. The Australian (AU) Patent Application No. 2011903152, filed on Aug. 5, 2011, is hereby incorporated by reference.

FIELD OF THE INVENTION

The present invention relates to systems and methods for managing video data. Embodiments of the invention have been particularly developed for managing user access to cameras in a Digital Video Management (DVM) system. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Digital Video Management (DVM) systems, such as those based on the Honeywell DVM model, are widely used. In overview, a plurality of cameras are assigned to a plurality camera servers, with each camera server being configured to make available (for live viewing or recording purposes) video data from an assigned one or more cameras. The camera servers are all centrally managed by a DVM database server.

In sites with a large number of cameras (for example more than 1,000 cameras), there are significant challenges in providing quick and convenient access to a desired one or more cameras. Such quick and convenient access is in some cases crucial, for example during an incident or emergency.

There is a need in the art for improved systems and methods for managing video data.

SUMMARY OF THE INVENTION

It is an object of the present invention to overcome or ameliorate at least one of the disadvantages of the prior art, or to provide a useful alternative.

One embodiment provides a method for managing video data in a DVM system, the method including:

providing a user interface for allowing an operator to view a plurality of video display objects, wherein each display object is configured to display live video data captured at a camera of the DVM system;

via the user interface, providing access to one or more camera groups, wherein the one or more camera groups are respectively defined by dynamic parameters; and updating the constituent cameras of each camera group responsive to changes in the dynamic parameters.

One embodiment provides a DVM system configured to perform a method as described herein.

One embodiment provides a tangible non-transitive carrier medium carrying computer executable code that, when executed via one or more processes, allows the performance of a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing video data. Embodiments are described by reference to a Digital Video Management (DVM) system, for example methods for providing a user with access to view live feed from cameras in a DVM system. In overview, a DVM system is configured to provide a user interface for allowing an operator to view a plurality of video display objects, wherein each display object is configured to display live video data captured at a camera of the DVM system. The user interface is further configured to provide access to one or more camera groups, wherein the one or more camera groups are respectively defined by dynamic parameters. The DVM system executes a process for updating the constituent cameras of each camera group responsive to changes in the dynamic parameters. For example, in one embodiment there is a camera group defined by cameras recently viewed by a particular client. That group is updated thereby to provide an operator with quick and convenient access to recently viewed cameras.

System Level Overview

Figure 1:
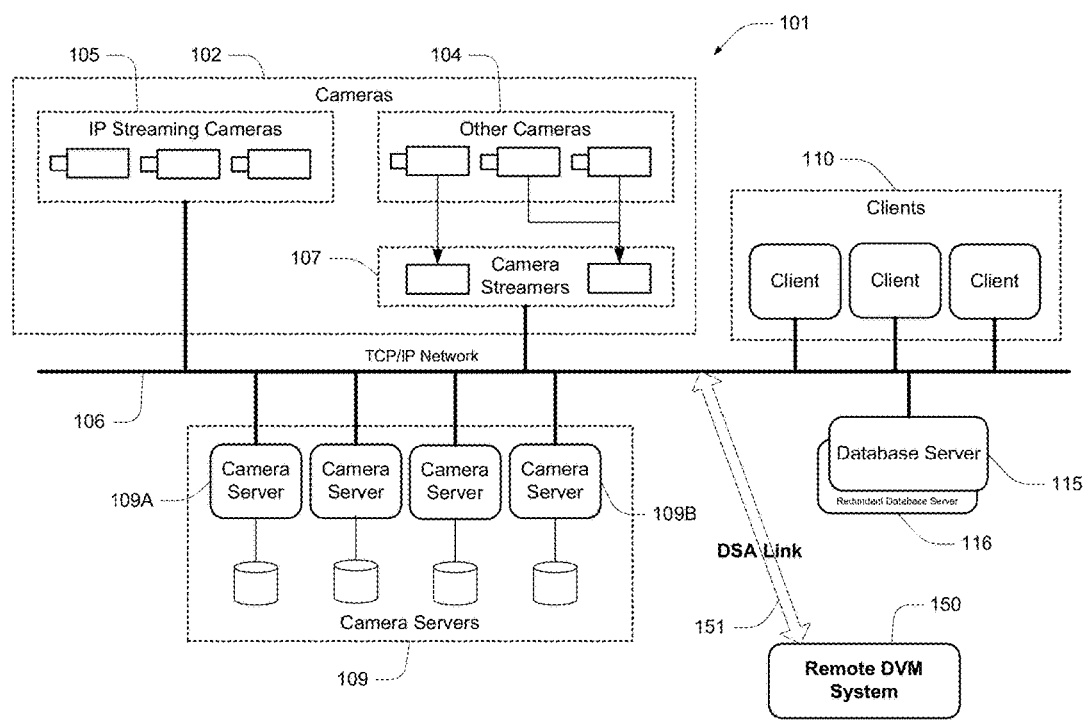
FIG. 1 schematically illustrates a DVM system according to one embodiment.

FIG. 1 illustrates a general Digital Video Management (DVM) system 101. System 101 is described to provide general context to various embodiments discussed below. Although embodiments are described by reference to DVM systems based on system 101, the present invention is not limited as such. That is, system 101 is provided as a general example to highlight various features of an exemplary DVM system. In practice, many systems omit one or more of these features, and/or include additional features.

System 101 includes a plurality of video streaming units 102. Units 102 include conventional cameras 104 (including analogue video cameras) coupled to discrete video streaming units, and IP streaming cameras 105. Video streaming units 102 stream video data, presently in the form of surveillance footage, on a TCP/IP network 106. This is readily achieved using IP streaming cameras 105, which are inherently adapted for such a task. However, in the case of other cameras 104 (such as conventional analogue cameras), a discrete video streaming unit 107 is required to convert a captured video signal into a format suitable for IP streaming.

For the purposes of the present disclosure, the term "video streaming unit" should be read to include IP streaming cameras 105 and video streaming units 107. That is, the term "video streaming unit" describes any hardware component configured to stream video data onto a network, independent of the source of the originating analogue video data.

For the present purposes, the terms "video streaming unit" and "camera" are generally used interchangeably, on the assumption that each video streaming unit corresponds to a unique set of optical components used to capture video. That is, there is a one-to-one relationship between streaming units 107 and cameras 104. However, in other embodiments there is a one-to-many relationship between streaming units 107 and cameras 104 (i.e. a streaming unit is configured for connection to multiple cameras).

One or more camera servers 109 are also connected to network 106 (these may be either physical servers or virtual servers). Each camera server is enabled to have assigned to it one or more of video streaming units 102. In some embodiments the assignment is on a stream-by-stream basis rather than a camera-by-camera basis. This assignment is carried out using a software-based configuration tool, and it follows that camera assignment is virtual rather than physical. That is, the relationships are set by software configuration rather than hardware manipulation. In practice, each camera has a unique identifier. Data indicative of this identifier is included with surveillance footage being streamed by that camera such that components on the network are able to ascertain from which camera a given stream originates.

In the present embodiment, camera servers are responsible for making available both live and stored video data. In relation to the former, each camera server provides a live stream interface, which consists of socket connections between the camera manager and clients. Clients request live video through the camera server's COM interfaces and the camera server then pipes video and audio straight from the relevant streaming unit to the client through TCP sockets. In relation to the latter, each camera server has access to a data store for recording video data. Although FIG. 1 suggests a one-to-one relationship between camera servers and data stores, this is by no means necessary. Each camera server also provides a playback stream interface, which consists of socket connections between the camera manager and clients. Clients create and control the playback of video stored that the camera server's data store through the camera manager's COM interfaces and the stream is sent to clients via TCP sockets.

Although, in the context of the present disclosure, there is discussion of one or more cameras or streaming units being assigned to a common camera server, this is a conceptual notion, and is essentially no different from a camera server being assigned to one or more cameras or streaming units.

Clients 110 execute on a plurality of client terminals, which in some embodiments include all computational platform on network 106 that are provided with appropriate permissions. Clients 110 provide a user interface (UI) that allows surveillance footage to be viewed in real time by an end-user. For example, one UI component is a render window, in which streamed video data is rendered for display to a user. In some cases this user interface is provided through an existing application (such as Microsoft Internet Explorer), whilst in other cases it is a standalone application. The user interface optionally provides the end-user with access to other system and camera functionalities, including mechanical, digital and optical camera controls, control over video storage, and other configuration and administrative functionalities (such as the assignment and reassignment of cameras to camera servers). Typically clients 110 are relatively "thin", and commands provided via the relevant user interfaces are implemented at a remote server, typically a camera server. In some embodiments different clients have different levels of access rights. For example, in some embodiments there is a desire to limit the number of users with access to change configuration settings or mechanically control cameras.

System 101 also includes a DVM database server 115. Database server 115 is responsible for maintaining various information relating to configurations and operational characteristics of system 101, and for managing events within the system. In terms of events, the general notion is that an action in the system (such as the modification of data in the database, or the reservation of a camera, as discusses below) causes an event to be "fired" (i.e. published), this having follow-on effects depending on the nature of the event.

In the present example, the system makes use of a preferred and redundant database server (115 and 116 respectively), the redundant server essentially operating as a backup for the preferred server. The relationship between these database servers is generally beyond the concern of the present disclosure.

Some embodiments of the present invention are directed to distributed DVM systems, also referred to as "distributed system architecture" (DSA). In general terms, a distributed DVM system includes a plurality of (i.e. two or more) discrete DVM systems, such as system 101. These systems are discrete in the sense that they are in essence standalone systems, able to function autonomously without the other by way of their own DVM servers. They may be distributed geographically (for example in different buildings, cities or countries), or notionally (in a common geographic location, but split due to individual system constraints, for example camera server numbers, or simply to take advantage of benefits of a distributed architecture). In the context of FIG. 1, a remote system 150, communicates with the local system via a DSA link 151. For the present purposes, it is assumed that remote system 150 is in a general sense similar to the local system. Various components (hardware and software) are configured to allow communications between the systems, for example via a network connection (including, but not limited to, an Intranet or Internet connection), or other communications interface. For the sake of the present embodiments, it is assumed that the inter-system communications occur by way of TCP/IP connections, and in this manner any communications channel supporting TCP/IP may be used.

Camera Group Management

FIG. 2 illustrates components of an exemplary DVM system (such as the system of FIG. 1), but simplified to illustrate components relevant to camera group management.

A camera 201 is associated with a camera server 202. Camera server 202 is configured to access video data made available by camera 201, either for live viewing or for recording to a storage device 203. Camera server 202 is configured/controlled by a DVM server 204. There may be a large number of cameras and camera servers configured/controlled by DVM server 204.

DVM server 204 executes DVM administration modules 205. The functional block for modules 205 is used to simplistically represent a wide range of software components implemented within a DVM system. Only a selection of these are shown, being user interface modules 230 and a content sharing module 250.

DVM server 204 communicates with a user interface 210 which executes on a client terminal 211. In the present embodiment, this user interface is provided via module 230 via a web-server type arrangement (i.e. user interface 210 is provided via a web-browser at terminal 211 which renders data transmitted by server 211). In this manner, module 230 is configured to allow a plurality of terminals 211 to independently provide respective instantiations user interface 210 for a respective plurality of operators.

User interface 210 is configured to display live and recorded video data to a user via a video display objects (and, in some embodiments, other DVM content such as screenshots, maps, and the like). In the example of FIG. 2, a plurality of display objects are shown as being rendered on-screen simultaneously, including a major display object 212 and minor display objects 213A-E. These are configured to each display live video data from respective cameras (such as camera 201).

User interface 210 provides various controls 217 (which simplistically represents a variety of GUI controls available to an operator of terminal 211, such as record control, camera position control, camera view selection, and so on).

DVM server 204 additionally provides a camera group management module 250. However, it will be appreciated that in other embodiments some or all of the functionality of module 250 is handled at client terminal 211 within user interface 210. In overview, module 250 is responsible for managing camera groups that are respectively defined by dynamic parameters, such as camera parameters, user parameters, user interface parameters, or camera server parameters. The general crux of the parameters being "dynamic" is that the values for the parameters change over time, such that the constituent cameras that make up a given group vary over time. Module 250 is configured to keep the groups up to date, achieved by either assessing parameters periodically, updating the group in response to monitored events, or updating the group in response to a request that requires the group to be updated (for example a "refresh" command).

In some embodiments user interface 210 is configured to enable user creation of camera groups based on specified dynamic parameters, for example by way of a camera group controls object 216, which provides access an interface by which a user is permitted to create a new group or modify an existing group. In either case, the creation/modification process includes selection of parameters (such as dynamic parameters) that are to define the group, with the selection being made from a list of available parameters. By way of example, parameters are optionally selected thereby to configure groups for one or more of the following:

Cameras recently viewed at a given client terminal. For example, the dynamic parameter may be a camera "last accessed time" for cameras viewed at the relevant client terminal.

Cameras recently viewed across the DVM system. For example, the dynamic parameter may be a camera "last accessed time".

Cameras having a high view rate over a predefined period. For example, the dynamic parameter may be a "times viewed" and/or a parameter related to the number of viewing clients and time viewed by each client.

Cameras having greater than a threshold incident rate over a predefined period. For example, the dynamic parameter may be related to an "incidents recorded" value and/or data supplied by video analytics software.

Cameras having greater than a threshold motion rate over a predefined period. For example, the dynamic parameter may be a measure of camera movement, or number of times the camera was moved (e.g. in terms of pan, tilt and zoom).

Cameras having greater than a threshold number of movement observations, based on analytics software, over a predefined period. For example, the dynamic parameter may be a value supplied by video analytics software that is configured to identify movement in a camera's field of view.

Cameras in respect of which alarms have been raised over a predefined period. For example, the dynamic parameter may be a camera alarm count value.

Cameras displaying a fail condition. For example, the dynamic parameter may be an active camera fail or error value.

Cameras which have had greater than a threshold number of fail or error conditions over a predetermined period. This is useful in allowing a user to observe the feed from these cameras, which may intermittently fail given the error rate.

Cameras that are proximally close (in location or field of view) to currently or recently viewed cameras.

It will be appreciated that there is a wide range of groups able to be created, given the flexible approach of allowing a user to select defining parameters.

In some cases, wherein each group has a maximum size, and is populated by a set of cameras of up to and including the maximum size that best satisfy the dynamic parameters. For example, the maximum size may be 10, and the 10 cameras selected to populate the group are either those that best match the dynamic parameter, or those which have most recently matched the dynamic parameter. In the case of a "recently used cameras" group, this would display the 10 most recently sued cameras, with the $11^{th}$ most recent dropping out of the group each time another camera ceases to be used.

In some cases a camera group is displayable in a list or tree structure, and cameras in the list are able to be dragged and dropped into user interface video display objects. In some cases, as an alternative or in additional to "drag and drop", a click-based selection is made, and the relevant camera view is automatically moved to a major display object, or moved to a major/minor display object selected based on a prioritization algorithm.

Figure 2A:
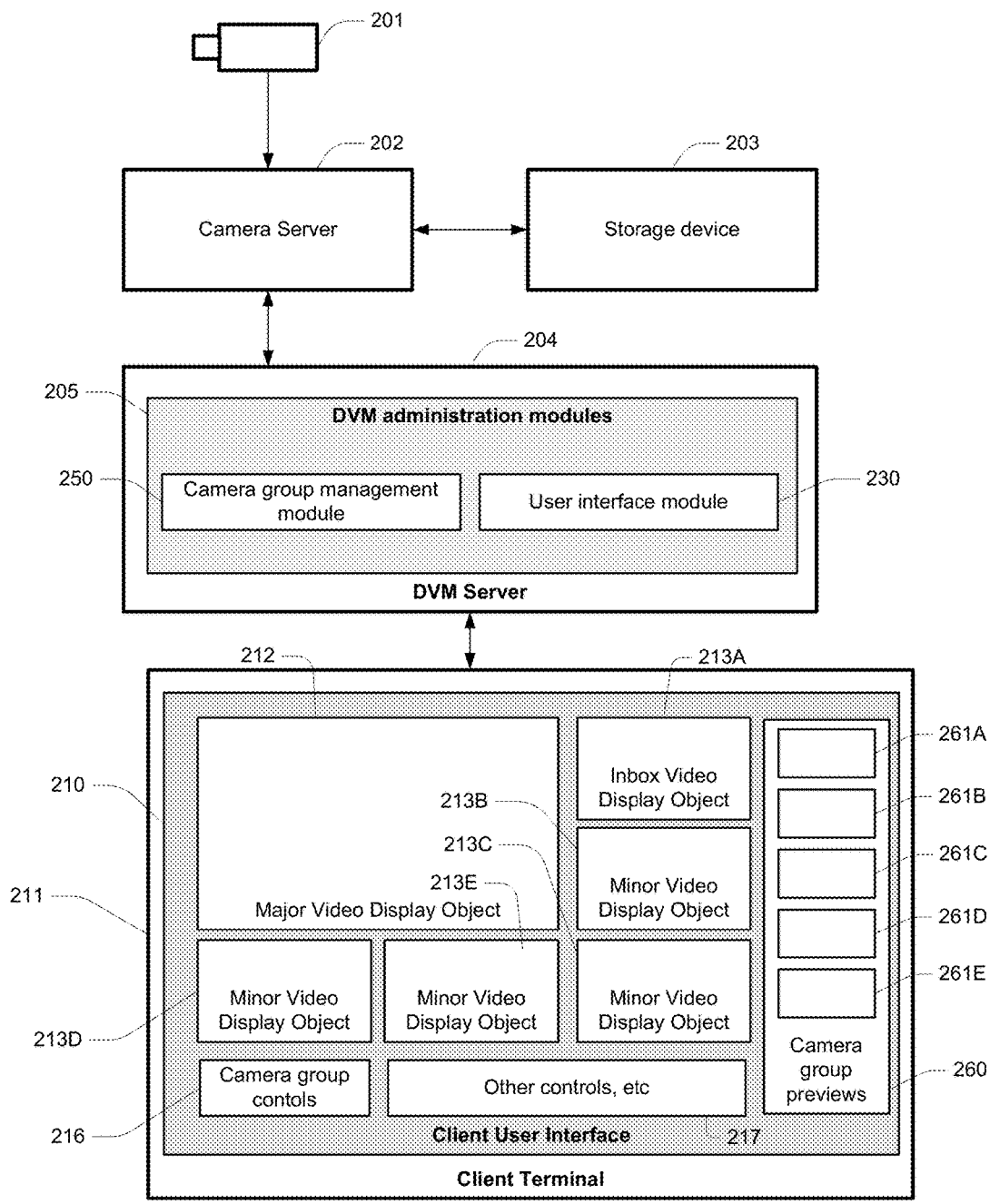
FIG. 2A schematically illustrates a DVM system according to one embodiment.

In some cases a camera group is able to be launched into a multi-object view (having an object arrangement similar to that of FIG. 2A, or alternately a different geometric layout). The example of FIG. 2A shows a user interface object, in the form of a camera group preview object 260, which includes a screenshot or streaming live feed for each of the cameras in the group. The screenshots, or streaming live feeds, are displayed in video display objects 261A-E. In some cases, where live streaming is provided via objects 261A-E, the live video streaming rate varies between the cameras in response to specified criteria. For example, in some cases there are additional objects displayed off-screen (requiring a user to scroll down to make them visible); these are streamed at a lower rate until displayed on screen. In the cases of a "recently viewed" camera group, the streaming rate decreases based on the time elapsed since a camera was viewed and/or as the number of cameras more recently viewed than that camera increases.

Figure 2B:
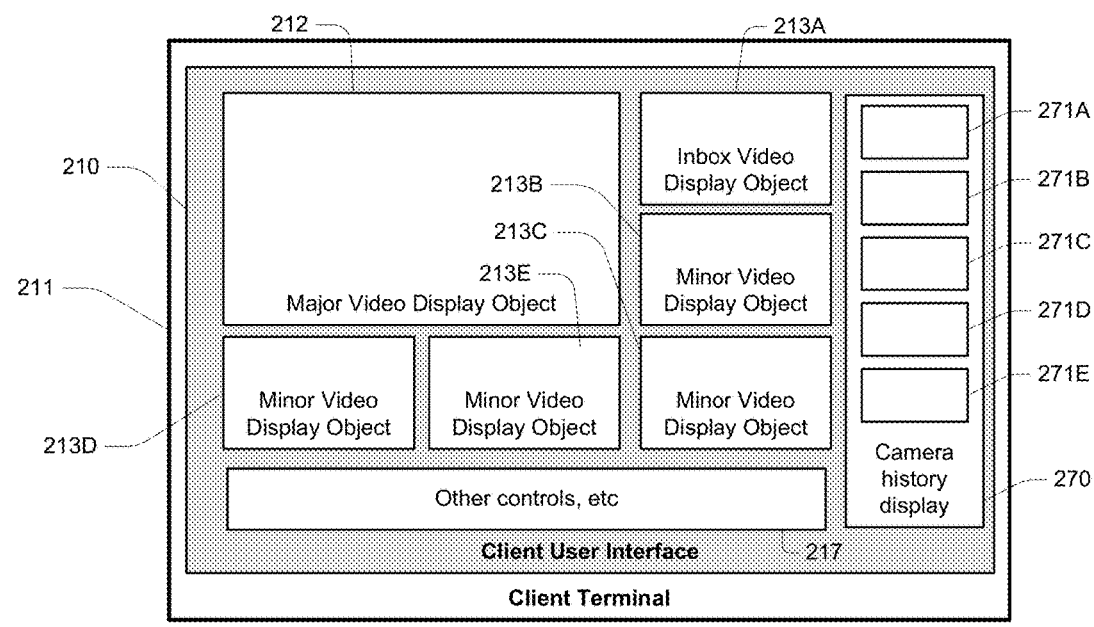
FIG. 2B schematically illustrates a DVM system client terminal and user interface according to one embodiment.

FIG. 2B illustrates an embodiment specifically directed towards maintaining convenient access to recently used cameras. To this end, user interface 210 includes a camera display history object 270, which is configured to contain a plurality of video display objects (with objects 271A-E being shown, and potentially additional accessible by way of a scrolling operation). During use of user interface 210, which cameras are displayed in objects 212 and 213A-E varies over time (for example as a result of user activity, or as a result of automated events such as alarms or the like). Each time a new camera is displayed by one of the display objects, another camera which was previously displayed ceases to be displayed (given the limited number of display objects). That is, one camera moves from a state of being presently used, to being the most recently used. The recently viewed camera group of object 270 preferably ahs a maximum size of n. That is, the group is defined by the most recent n cameras viewed via the user interface, wherein 0≤n<a predefined maximum.

Objects 271A-E are respectively indicative of the most recently used cameras. These objects in some embodiments provide live video streaming of their respective cameras (although preferably at a lower rate/quality thereby to conserve CPU and network resources). In other embodiments they each provide a still image taken from the respective cameras (which may be predefined or taken at a designated time, such as the time at which the camera was last viewed, and is optionally periodically updated). In some embodiments, objects 271A-E are camera names or descriptors.

Preferably, a selected one of objects 271A-E is able to be dragged-and-dropped onto a selected major or minor video display object, thereby to instruct the user interface to display the video stream from the camera associated with the selected object 217A-E via the selected major/minor display object.

Figure 3:
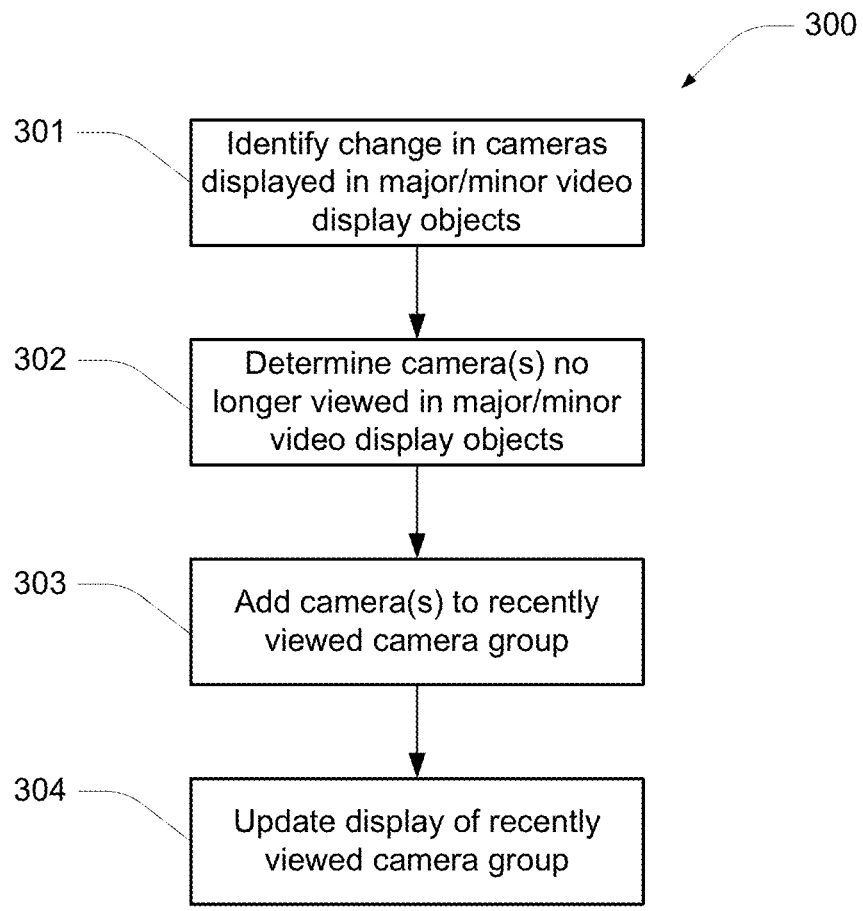
FIG. 3 illustrates a method according to one embodiment.

FIG. 3 illustrates an exemplary method 300 for managing a recently sued camera group. In the context of method 300, 301 includes identifying a change in cameras displayed in major/minor video display objects. 302 includes determining a camera or set of cameras that are no longer displayed in major/minor display objects based on the identified change. Those cameras are added to the "recently viewed" camera group at 303, and the display of that group (for example object 270) us updated accordingly at 304.

Figure 2C:
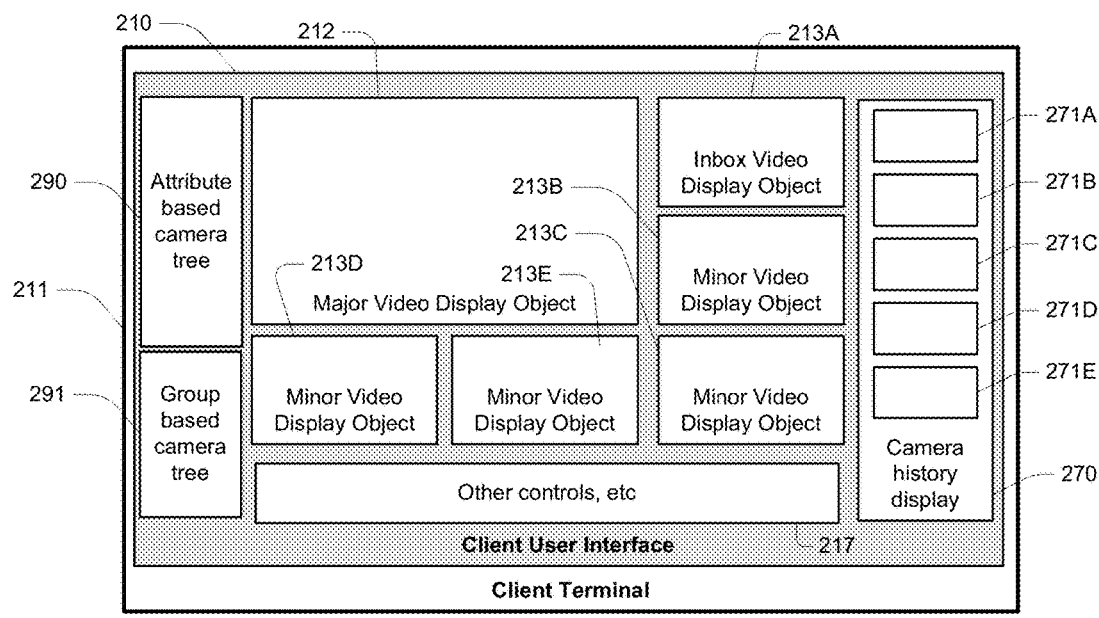
FIG. 2C schematically illustrates a DVM system client terminal and user interface according to one embodiment.

FIG. 2C illustrates a further exemplary user interface instantiation. This is similar to FIG. 2B, but with two additional objects on the left hand side. An attribute based camera tree object 290 sets out cameras based on attributes (such as location or the like). This may be in the form of a hierarchical tree, or a list. A group based camera tree 291 sets out cameras based on camera groups. That is, a user is able to navigate camera groups using object 291 and then, for example, drag and drop a desired camera into one of the major or minor video display objects thereby to view live video data from that camera. In some cases a user ca select a camera group, and launch a multi-display-object view for simultaneously viewing live video data for a selection of or all of the cameras in that group.

Conclusions and Interpretation

It will be appreciated that the disclosure above provides various significant systems and methods for managing video data. For example, the present embodiments allows for cameras to be more readily accessed by a user, either by way of flexibly defined groups based on dynamic parameters, or by configuring an object to keep track of recently used cameras.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; a carrier wave bearing a propagated signal detectable by at least one processor of the one or more processors and representing the set of instructions a propagated signal and representing the set of instructions; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for managing video data in a DVM system, the method including:
    providing a user interface for allowing an operator to view a plurality of video display objects, wherein the plurality of display objects are each simultaneously displaying live video data captured at a camera of the DVM system;
    via the user interface, providing access to one or more camera groups, each camera group including one or more constituent cameras that are all providing live video streaming;
    defining the one or more camera groups based on dynamic parameters which change automatically over time such that the constituent cameras that are in a given group change over time; and
    updating the constituent cameras that make up each camera group in response to changes in the dynamic parameters.

2. A method according to claim 1 wherein the one or more groups includes a recently viewed camera group defined by the most recent n cameras viewed via the user interface, wherein 0<n<a predefined maximum.

3. A method according to claim 2 wherein the user interface is configured to display a screen object containing video display objects indicative of the cameras in the recently viewed camera group.

4. A method according to claim 3 wherein the video display objects provide live video streaming.

5. A method according to claim 4 wherein the live video streaming is at a rate less than the rate of streaming when the cameras where being viewed.

6. A method according to claim 1 wherein the live video streaming rate varies between the cameras in the viewed camera groups in response to specified criteria.

7. A method according to claim 1 wherein the user interface is configured to enable user creation of camera groups based on specified dynamic parameters.

8. A method according to claim 1 wherein the one more groups are defined by dynamic parameters thereby to configure groups for one or more of the following:
    cameras recently viewed at a given client terminal;
    cameras recently viewed across the DVM system;
    cameras having a high view rate over a predefined period;
    cameras having greater than a threshold incident rate over a predefined period;
    cameras having greater than a threshold motion rate over a predefined period;
    cameras having greater than a threshold number of movement observations, based on analytics software, over a predefined period;
    cameras in respect of which alarms have been raised over a predefined period;
    cameras which have had greater than a threshold number of fail or error conditions over a predetermined period; and
    cameras having a fail or error condition.

9. A method according to claim 8 wherein each group has a maximum size, and is populated by a set of cameras of up to and including the maximum size that best satisfy the dynamic parameters.

10. A method according to claim 1 wherein a given camera group is displayable in a user interface object including a screenshot or streaming feed for each of the cameras.

11. A DVM system configured to perform a method including:
    providing a user interface for allowing an operator to view a plurality of video display objects, wherein the plurality of display objects are each simultaneously displaying live video data captured at a camera of the DVM system;
    via the user interface, providing access to one or more camera groups that are all providing live video streaming;
    defining the one or more camera groups based on dynamic parameters that change automatically over time such that the constituent cameras that are in a given group change over time; and
    updating the constituent cameras that make up each camera group in response to changes in the dynamic parameters.

12. A DVM system according to claim 11 including:
    a plurality of camera servers, wherein each camera server is configured to utilise video data from an assigned one or more video streaming units; and
    a plurality of video streaming units, wherein each streaming unit is configured to stream, onto a network, video data for a respective camera.

13. A DVM system according to claim 11 wherein the one or more camera groups includes a recently viewed camera group defined by the most recent n cameras viewed via the user interface, wherein 0<n<a predefined maximum.

14. A DVM system according to claim 12 wherein the user interface is configured to display a screen object containing video display objects indicative of the cameras in the recently viewed camera group.

15. A DVM system according to claim 11 wherein the live video streaming rate varies between the cameras in the viewed camera groups in response to specified criteria.

16. A DVM system according to claim 11 wherein the user interface is configured to enable user creation of camera groups based on specified dynamic parameters.

17. A tangible non-transitive computer-readable carrier medium carrying computer executable code that, when executed via one or more processes, allows the performance of a method including:
   providing a user interface for allowing an operator to view a plurality of video display objects, wherein the plurality of display objects are each simultaneously displaying live video data captured at a camera of the DVM system;
   via the user interface, providing access to one or more camera groups that are all providing live video streaming;
   defining the one or more camera groups based on dynamic parameters that change automatically over time such that the constituent cameras that are in a given group change over time; and
   updating the constituent cameras that make up each camera group in response to changes in the dynamic parameters.

18. A computer-readable carrier medium according to claim 17 wherein the one or more camera groups includes a recently viewed camera group defined by the most recent n cameras viewed via the user interface, wherein 0<n<a predefined maximum.

19. A computer-readable carrier medium according to claim 17 wherein the live video streaming rate varies between the cameras in the viewed camera groups in response to specified criteria.

20. A computer-readable carrier medium according to claim 17 wherein the user interface is configured to enable user creation of camera groups based on specified dynamic parameters.

* * * * *